(12) United States Patent
Wenig

(10) Patent No.: US 10,063,473 B2
(45) Date of Patent: Aug. 28, 2018

(54) METHOD AND SYSTEM FOR FACILITATING SWITCH VIRTUALIZATION IN A NETWORK OF INTERCONNECTED SWITCHES

(71) Applicant: BROCADE COMMUNICATIONS SYSTEMS, INC., San Jose, CA (US)

(72) Inventor: Glenn C. Wenig, Pleasanton, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 311 days.

(21) Appl. No.: 14/680,915

(22) Filed: Apr. 7, 2015

(65) Prior Publication Data

US 2015/0319088 A1 Nov. 5, 2015

Related U.S. Application Data

(60) Provisional application No. 61/986,798, filed on Apr. 30, 2014.

(51) Int. Cl.
*H04L 12/741* (2013.01)
*H04L 29/06* (2006.01)
(Continued)

(52) U.S. Cl.
CPC ........ *H04L 45/745* (2013.01); *H04L 49/3009* (2013.01); *H04L 49/70* (2013.01); *H04L 69/22* (2013.01)

(58) Field of Classification Search
CPC .......... H04L 29/0653; H04L 29/06095; H04L 49/3009; H04L 49/309; H04L 45/74
See application file for complete search history.

(56) References Cited

U.S. PATENT DOCUMENTS 2,854,352 A 9/1958 Gronemeyer
5,390,173 A 2/1995 Spinney
(Continued)

FOREIGN PATENT DOCUMENTS

CN 1735062 2/2006
CN 1777149 5/2006
(Continued)

OTHER PUBLICATIONS

Office Action dated Jul. 6, 2016, U.S. Appl. No. 14/618,941, filed Feb. 10, 2015.

(Continued)

*Primary Examiner* — Hassan Phillips
*Assistant Examiner* — Prenell Jones
(74) *Attorney, Agent, or Firm* — Shun Yao; Park, Vaughan, Fleming & Dowler LLP

(57) ABSTRACT

One embodiment of the present invention provides a computing system. The computing system includes a processor and a memory storing instructions that are executed by the processor. The computing system stores in a first table a first mapping between a first switch identifier and a next-hop switch identifier for the first switch identifier, and stores in a second table a second mapping between the first switch identifier and a first media access control (MAC) address of a remote device. The computing system encapsulates a first packet, which has first MAC address as a destination address, in a first encapsulation header with the first switch identifier as an egress switch identifier of the first encapsulation header. This encapsulated packet is forwarded in a network of interconnected switches based on the first encapsulation header.

21 Claims, 8 Drawing Sheets

(51) Int. Cl.
*H04L 12/931* (2013.01)
*H04L 12/935* (2013.01)

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B2 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Ramanathan |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Ha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |

(56) References Cited

U.S. PATENT DOCUMENTS

| | | |
|---|---|---|
| 9,524,173 B2 | 12/2016 | Guntaka |
| 9,626,255 B2 | 4/2017 | Guntaka |
| 9,628,407 B2 | 4/2017 | Guntaka |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Holmgren |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copelandiii |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1* | 7/2008 | Regan .............. H04L 45/00 370/351 |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |

(56) References Cited

U.S. PATENT DOCUMENTS

| | | |
|---|---|---|
| 2008/0225852 A1 | 9/2008 | Melman |
| 2008/0225853 A1 | 9/2008 | Melman |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Shelly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0085562 A1* | 4/2009 | Strange .................. G01R 33/28 324/307 |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hares |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Shukla |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1* | 9/2010 | Gupta .................. H04L 12/4625 370/225 |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Gray |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1* | 11/2010 | Raman .................. H04L 45/00 370/395.2 |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | Shah |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Xiong |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |

(56) References Cited

U.S. PATENT DOCUMENTS

| | | |
|---|---|---|
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1* | 11/2011 | Vobbilisetty .......... H04L 49/357 398/45 |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |

(56) References Cited

U.S. PATENT DOCUMENTS

| | | | |
|---|---|---|---|
| 2014/0112122 A1* | 4/2014 | Kapadia | H04L 45/74 370/219 |
| 2014/0140243 A1 | 5/2014 | Ashwood-Smith | |
| 2014/0157251 A1 | 6/2014 | Hocker | |
| 2014/0169368 A1 | 6/2014 | Grover | |
| 2014/0192804 A1 | 7/2014 | Ghanwani | |
| 2014/0241147 A1 | 8/2014 | Rajagopalan | |
| 2014/0258446 A1 | 9/2014 | Bursell | |
| 2014/0269701 A1 | 9/2014 | Kaushik | |
| 2014/0269720 A1 | 9/2014 | Srinivasan | |
| 2014/0269733 A1* | 9/2014 | Venkatesh | H04L 12/4641 370/395.53 |
| 2014/0298091 A1 | 10/2014 | Carlen | |
| 2014/0355477 A1 | 12/2014 | Moopath | |
| 2014/0362854 A1 | 12/2014 | Addanki | |
| 2014/0362859 A1 | 12/2014 | Addanki | |
| 2015/0009992 A1 | 1/2015 | Zhang | |
| 2015/0010007 A1 | 1/2015 | Matsuhira | |
| 2015/0016300 A1 | 1/2015 | Devireddy | |
| 2015/0030031 A1 | 1/2015 | Zhou | |
| 2015/0092593 A1 | 4/2015 | Kompella | |
| 2015/0110111 A1 | 4/2015 | Song | |
| 2015/0110487 A1 | 4/2015 | Fenkes | |
| 2015/0117256 A1 | 4/2015 | Sabaa | |
| 2015/0127618 A1 | 5/2015 | Alberti | |
| 2015/0139234 A1 | 5/2015 | Hu | |
| 2015/0143369 A1 | 5/2015 | Zheng | |
| 2015/0172098 A1 | 6/2015 | Agarwal | |
| 2015/0188753 A1 | 7/2015 | Anumala | |
| 2015/0195093 A1 | 7/2015 | Ramasubramani | |
| 2015/0222506 A1 | 8/2015 | Kizhakkiniyil | |
| 2015/0248298 A1 | 9/2015 | Gavrilov | |
| 2015/0263991 A1 | 9/2015 | MacChiano | |
| 2015/0271104 A1* | 9/2015 | Chikkamath | H04L 12/4633 370/401 |
| 2015/0281066 A1 | 10/2015 | Koley | |
| 2015/0301901 A1 | 10/2015 | Rath | |
| 2015/0347468 A1 | 12/2015 | Bester | |
| 2016/0072899 A1 | 3/2016 | Tung | |
| 2016/0087885 A1 | 3/2016 | Tripathi | |
| 2016/0139939 A1 | 5/2016 | Bosch | |
| 2016/0182458 A1 | 6/2016 | Shatzkamer | |
| 2016/0344640 A1 | 11/2016 | Derlund | |
| 2017/0026197 A1* | 1/2017 | Venkatesh | H04L 12/4641 |
| 2017/0097841 A1 | 4/2017 | Chang | |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jun. 18, 215, U.S. Appl. No. 13/098,490, filed May 2, 2011.
Office Action dated Sep. 22, 2015 U.S. Appl. No. 13/656,438, filed Oct. 19, 2012.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
"Network based IP VPN Architecture using Virtual Routers" Paul Knight et al.

(56) References Cited

OTHER PUBLICATIONS

Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 13/288,822, dated May 26, 2017.
Office Action for U.S. Appl. No. 14/329,447, dated Jun. 8, 2017.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
'RBridges: Base Protocol Specification', IETF Draft, Perlman et al., Jun. 26, 2009.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Office action dated Aug. 29, 2014, U.S. Appl. No. 13/042,259, filed Mar. 7, 2011.
Office Action dated Mar. 14, 2014, U.S. Appl. No. 13/092,460, filed Apr. 22, 2011.
Office action dated Aug. 21, 2014, U.S. Appl. No. 13/184,526, filed Jul. 16, 2011.
Office Action dated Mar. 6, 2014, U.S. Appl. No. 13/425,238, filed Mar. 20, 2012.
Office Action dated Feb. 28, 2014, U.S. Appl. No. 13/351,513, filed Jan. 17, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: HyperEdge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundry FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011 dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.

(56) References Cited

OTHER PUBLICATIONS

Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Office Action dated Apr. 9, 2014, U.S. Appl. No. 13/092,724, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office Action dated Jun. 18, 2014, U.S. Appl. No. 13/440,861, filed Apr. 5, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT)', draft-lapuh-network-smlt-08, Jul. 2008.
Office Action for U.S. Appl. No. 13/098,490, filed May 2, 2011, dated Mar. 27, 2014.
Perlman, Radia et al., 'RBridges: Base Protocol Specification; Draft-ietf-trill-rbridge-protocol-16.txt', Mar. 3, 2010, pp. 1-117.
Zhai F. Hu et al. 'RBRidge: Pseudo-Nickname; draft-hu-trill-pseudonode-nickame-02.txt', May 15, 2012.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
Brocade 'Brocade Unveils 'The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. App. No. 13/365,993, filed Feb. 3, 2012, dated Jul. 23, 2013.
Office Action for U.S. Appl. No. 13/365,808, filed Jul. 18, 2013, dated Jul. 18, 2013.
Office Action for U.S. Appl. No. 13/092,887, dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.

(56) References Cited

OTHER PUBLICATIONS

Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl No. 13/044,326, filed Mar. 9, 2011, dated Jul. 7, 2014.
Office Action for U.S. Appl No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action dated Jun. 10, 2015, U.S. Appl. No. 13/890,150, filed May 8, 2013.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13656438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.

(56) References Cited

OTHER PUBLICATIONS

Open Flow Switch Specification Version 1.2 Dec. 5, 2011.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.

* cited by examiner

FORWARDING TABLE 200

| SWITCH ID 202 | SWITCH ID 212 |
| | SWITCH ID 214 |
| SWITCH ID 204 | SWITCH ID 214 |
| | SWITCH ID 216 |

FIG. 2A

EDGE MAC TABLE 250

| SWITCH ID 202 | MAC ADDRESS 232 |
| SWITCH ID 202 | MAC ADDRESS 234 |
| SWITCH ID 202 | MAC ADDRESS 236 |
| SWITCH ID 204 | MAC ADDRESS 238 |

FIG. 2B

METHOD AND SYSTEM FOR FACILITATING SWITCH VIRTUALIZATION IN A NETWORK OF INTERCONNECTED SWITCHES

RELATED APPLICATION

This application claims the benefit of U.S. Provisional Application No. 61/986,798, titled "Method and System for Facilitating Virtualized Member Switch in a Switch Fabric," by inventor Glenn Wenig, filed 30 Apr. 2014, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to network design. More specifically, the present disclosure relates to a method for a constructing a scalable switching system that extends the edge of a network.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While a fabric switch brings many desirable features to a network, some issues remain unsolved in efficiently coupling a large number of end devices (e.g., virtual machines) to the fabric switch.

SUMMARY

One embodiment of the present invention provides a computing system. The computing system includes a processor and a memory storing instructions that are executed by the processor. The computing system stores in a first table a first mapping between a first switch identifier and a next-hop switch identifier for the first switch identifier, and stores in a second table a second mapping between the first switch identifier and a first media access control (MAC) address of a remote device. The computing system encapsulates a first packet, which has first MAC address as a destination address, in a first encapsulation header with the first switch identifier as an egress switch identifier of the first encapsulation header. This encapsulated packet is forwarded in a network of interconnected switches based on the first encapsulation header.

In a variation on this embodiment, the second table is stored in a respective edge switch of the network. An edge switch couples at least one end device via a local edge port.

In a variation on this embodiment, the computing system further stores in the second table a third mapping between a second switch identifier of a local switching module and a MAC address of a local device.

In a further variation, the computing system identifies the second switch identifier as an egress identifier in an encapsulation header encapsulating a second packet and provides the second packet to the local device.

In a variation on this embodiment, the computing system adds the second mapping in the second table in response to identifying the second mapping in a payload of a notification message from a remote switch associated with the first switch identifier.

In a variation on this embodiment, the computing system determines whether a switch is capable of processing the first encapsulation header.

In a variation on this embodiment, a respective switch of the network is associated with a group identifier, wherein the group identifier indicates whether the switch is a member switch of the network.

BRIEF DESCRIPTION OF THE FIGURES

FIG. 2A illustrates an exemplary forwarding table with next-hop switches for virtual edge switches, in accordance with an embodiment of the present invention.

FIG. 2B illustrates an exemplary edge Media Access Control (MAC) table in a virtual edge switch, in accordance with an embodiment of the present invention.

In the figures, like reference numerals refer to the same figure elements.

DETAILED DESCRIPTION

Figure 1A:
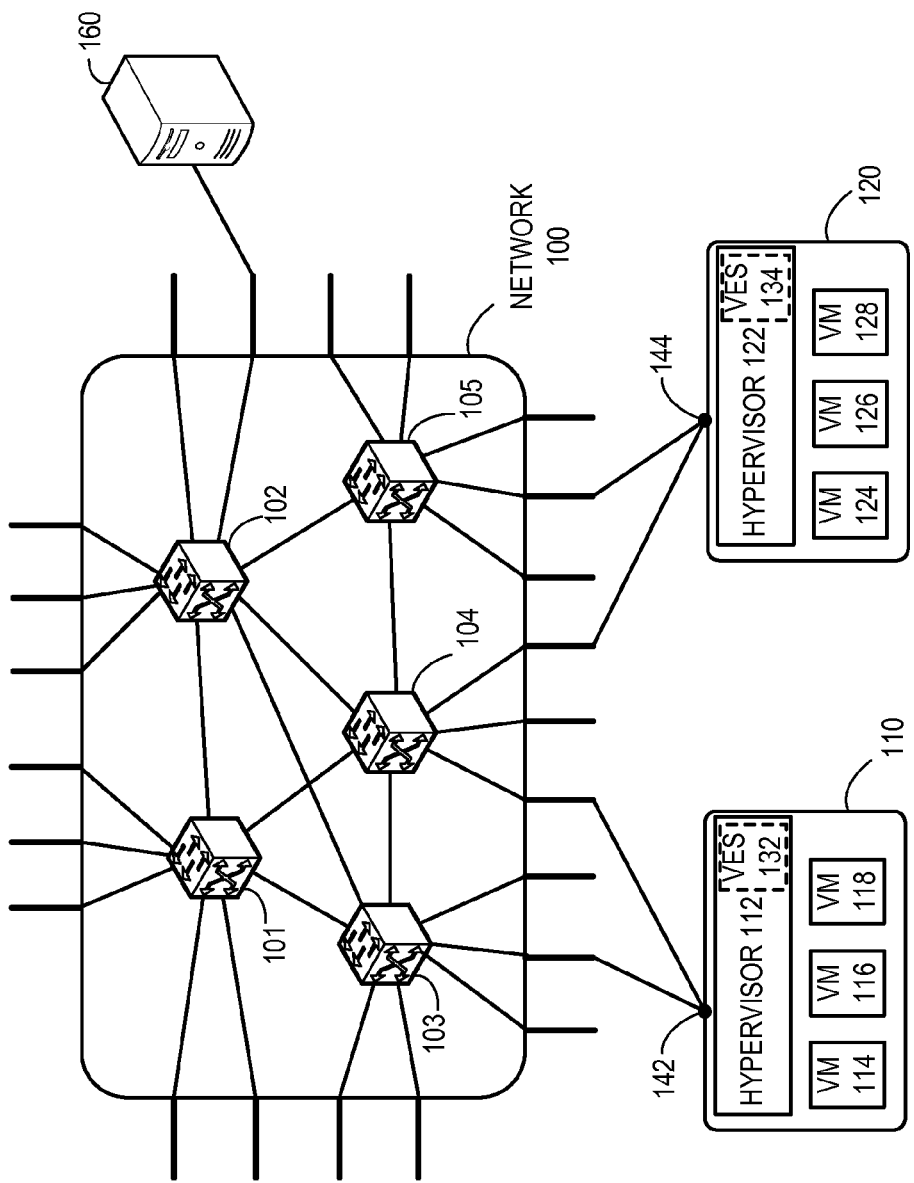
FIG. 1A illustrates an exemplary network with virtual edge switches, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of extending the edge of a network in a scalable way is solved by incorporating virtual edge switches running on host machines into the network. These host machines can host one or more virtual machines (VMs). These virtual edge switches operate as member switches of the network. In this way, the edge of the network is extended to the host machines.

With existing technologies, the switches in a network of interconnected switches can be referred to as member switches, which are coupled to each other via inter-switch ports. Some member switches couple end devices (e.g., a host machine, which is a computing device hosting one or more virtual machines) via edge ports. A switch coupling an end device can be referred to as an edge switch. When a member switch receives a packet via the edge port, the member switch learns the Media Access Control (MAC) address from the packet and maps the edge port with the learned MAC address. The member switch then constructs a notification message, includes the mapping in the notification message, and sends the notification message to other member switches of the network. In this way, a respective member switch is aware of a respective MAC address learned from an edge port of the fabric switch.

With server virtualization, an end device can be a host machine hosting a plurality of virtual machines. A host machine can include a hypervisor which runs a plurality of virtual machines, each of which can have one or more MAC addresses. As a result, a member switch can learn a large number of MAC addresses from its respective edge ports. Additionally, the member switch also may learn the MAC addresses learned at other member switches. As a result, MAC address learning can become un-scalable for the network and cause a MAC address explosion in the network.

To solve this problem, the edge of the network can be extended to the host machines by running virtualized edge switches in the hypervisors of the host machines. This virtual edge switches operate as member switches of the network. For example, the virtual edge switches can encapsulate packets to send the packets to other switches of the network via inter-switch links. These virtual edge switches thus become the edge switches of the network. The other member switches, which do not couple an end device, can be referred to as intermediate switches of the network. A virtual edge switch can reside in the hypervisor of the host machine. The virtual edge switch can also operate in the network interface card (NIC) of the host machine. For example, the virtual edge switch can be implemented in the application-specific integrated circuit (ASIC) of the card. The virtual edge switch can also be in a virtual network device, which is logically coupled to the hypervisor, running on the host machine. Since the virtual edge switches are members of the network, the intermediate nodes maintain routes to the virtual edge switches.

During operation, a virtual edge switch in a host machine receives a packet from a virtual machine in that host machine. The virtual edge switch, in turn, encapsulates the packet in an encapsulation header and forwards the encapsulated packet to the intermediate switches of the network. This encapsulation header can be based on a fabric encapsulation, which allows the packet to be forwarded in a fabric switch, or on a tunnel encapsulation, which allows the packet to be forwarded in a tunnel. Upon receiving the packet, the intermediate switches simply forward the packet based on the encapsulation header without checking the inner packet. As a result, the intermediate nodes can forward packets without learning the MAC address of the virtual machine in the host machine. Under such circumstances, the virtual edge switches learn and manage the MAC addresses and the intermediate node forwards the packets without learning the MAC addresses. In this way, the edge network of the network is extended to the host machines in a scalable way.

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm,"

which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a virtual local area network (VLAN). A fabric switch can accommodate a plurality of VLANs. A VLAN is typically identified by a VLAN tag. In contrast, the fabric switch is identified a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device hosting one or more virtual machines can be referred to as a host machine. In this disclosure, the terms "end device" and "host machine" are used interchangeably.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with virtual edge switches, in accordance with an embodiment of the present invention. As illustrated in FIG. 1A, a network 100 includes member switches 101, 102, 103, 104, and 105. In some embodiments, network 100 is a fabric switch. Switches 101, 102, 103, 104, and 105 then can operate as a single switch. In some embodiments, network 100 is a TRILL network and a respective member switch, such as switch 105, is a TRILL RBridge. In some embodiments, network 100 is an IP network and a respective member, such as switch 105, is an IP-capable switch, which calculates and maintains a local IP routing table (e.g., a routing information base or RIB), and is capable of forwarding packets based on its IP addresses.

In some embodiments, network 100 is assigned with a group identifier (e.g., a fabric identifier). A respective member switch of network 100 is associated with that group identifier. This allows the member switch to indicate that it is a member of network 100. In some embodiments, whenever a new member switch joins network 100, the group identifier is automatically associated with that new member switch. Furthermore, a respective member switch of network 100 is assigned a switch identifier (e.g., an RBridge identifier, a Fibre Channel (FC) domain ID (identifier), or an IP address). This switch identifier identifies the member switch in network 100.

In this example, end device 110 is coupled to switches 103 and 104, end device 120 is coupled to switches 104 and 105, and end device 160 is coupled to switch 102. End devices 110 and 120 can be host machines, each hosting one or more virtual machines. In this disclosure, the terms "end device" and "host machine" are used interchangeably. Host machine 110 includes a hypervisor 112 which runs virtual machines 114, 116, and 118. Host machine 110 can be equipped with a network interface card (NIC) 142 with one or more ports. Host machine 110 couples to switches 103 and 104 via the ports of NIC 142. Similarly, host machine 120 includes a hypervisor 122 which runs virtual machines 124, 126, and 128. Host machine 120 can be equipped with a NIC 144 with one or more ports. Host machine 120 couples to switches 103 and 104 via the ports of NIC 144.

Switches in network 100 use edge ports to communicate with end devices (e.g., non-member devices) and inter-switch ports to communicate with other member switches. For example, switch 102 is coupled to end device 160 via an edge port and to switches 101, 103, 104, and 105 via inter-switch ports and one or more links. Data communication via an edge port can be based on Ethernet and via an inter-switch port can be based on IP and/or TRILL protocol. It should be noted that control message exchange via inter-switch ports can be based on a different protocol (e.g., Internet Protocol (IP) or Fibre Channel (FC) protocol).

With server virtualization, host machines 110 and 120 host a plurality of virtual machines, each of which can have one or more MAC addresses. For example, hypervisor 112 of host machine 110 runs a plurality of virtual machines 114, 116, and 118. As a result, switch 103 can learn a large number of MAC addresses belonging to virtual machines 114, 116, and 118 from the edge port coupling host machine 110. Furthermore, switch 103 also learns a large number of MAC addresses belonging to virtual machines 124, 126, and 128 learned at switches 104 and 105 based on reachability information sharing among member switches. In this way, having a large number of virtual machines coupled to network 100 may make MAC address learning un-scalable for network 100 and cause a MAC address explosion.

To solve this problem, network 100 can be extended to host machines 110 and 120 by running virtual edge switches 132 and 134, respectively. Virtual edge switch 132 or 134 can operate as a member switch of network 100. In some embodiments, virtual edge switch 132 or 134 is a virtual module capable of operating as a switch and encapsulating a packet from a local device (e.g., a virtual machine) in an encapsulation header. Virtual edge switches 132 and 134 are assigned (e.g., either configured with or automatically assigned by a physical switch of network 100) respective switch identifiers. In some embodiments, switch identifier assigned to a virtual edge switch is in the same format as a switch identifier assigned to a physical switch of network 100. For example, if the switch identifier assigned to switch 103 is an RBridge identifier, the switch identifier assigned to virtual edge switch 132 can also be an RBridge identifier.

In some embodiments, virtual edge switches 132 and 134 reside in hypervisors 112 and 122, respectively. Virtual edge switches 132 and 134 can also reside in NICs 142 and 144, respectively, or in an additional virtual network device logically coupled to hypervisors 112 and 122, respectively. Virtual edge switches 132 and 134 can also be in one or more physical switches in network 100. It should be noted that Virtual edge switches 132 and 134 can reside in different types of devices. For example, virtual edge switch 132 can reside in hypervisor 112 and virtual edge switch 134 can reside in NIC 144. As a result, network 100 can include heterogeneous implementations of virtual edge switches. If virtual edge switch 132 resides in hypervisor 112, virtual edge switch 132 can be coupled to virtual machines 114, 116, and 118 via respective logical ports. Similarly, virtual edge switch 134 can be coupled to virtual machines 124, 126, and 128 via respective logical ports.

Because virtual edge switches 132 and 134 can operate as member switches of network 100, the links coupling host machines 110 and 120 can operate as inter-switch links (i.e., the ports in NICs 142 and 144 can operate as inter-switch ports). During initialization, virtual edge switch 132 determines whether switches 103 and 104 are compatible switches for a virtual edge switch based on a validation protocol. Virtual edge switch 132 can send one or more pre-determined values (e.g., physical layer symbols) to determine whether switches 103 and 104 are compatible switches. If virtual edge switch 132 does not receive a response from switches 103 and 104, virtual edge switch 132 determines that switches 103 and 104 are not compatible.

If compatible, virtual edge switch 132 determines whether switches of network 100 support inter-operation with a virtual edge switch based on a discovery protocol (e.g., Brocade Link Discovery Protocol (BLDP)). In some embodiments, virtual edge switch 132 determines whether network 100 can support virtual edge switch 132 as a member switch (e.g., whether network 100 is a fabric switch) based on the discovery protocol. In some embodiments, virtual edge switch 132 determines whether switches 103 and 104 can process an encapsulation header (e.g., a fabric encapsulation header or a tunnel encapsulation header) of a packet. When virtual edge switch 132 becomes active, virtual edge switch 132 can use the discovery protocol to notify network 100. Switch 103 or 104 can send a notification message comprising a switch identifier for virtual edge switch 132. In turn, virtual edge switch 132 can self-assign the switch identifier. Virtual edge switch 132 can also be pre-configured with the switch identifier. Virtual edge switch 132 can exchange link parameters and switch capabilities of virtual edge switch 132 with switches 103 and 104, which in turn, notify other member switches of network 100 regarding this information.

In some embodiments, a respective member switch of network 100 maintains a forwarding table which maps a switch identifier to a next-hop switch identifier. For example, since virtual edge switch 132 is reachable from switch 101 via switches 103 and 104, switch 101 maintains a forwarding table which maps switch identifier of virtual edge switch 132 to respective switch identifiers of switches 103 and 104. As a result, upon detecting an egress packet for virtual switch 132, switch 101 forwards the packet to switch 103 or 104. In some embodiments, virtual edge switch 132 can participate in the path discovery process (e.g., a routing process, such as Fabric Shortest Path First (FSPF)), which allows switch 101 to discover that virtual edge switch 132 is reachable from switch 101 via switches 103 and 104. For example, switch 101 has two equal-cost paths (e.g., Equal Cost Multiple Paths or ECMP) to virtual edge switch 132 via switches 103 and 104. Virtual edge switch 132 can notify other switches of network 100 that switches of network 100 is not reachable via virtual edge switch 132, thereby avoiding operating as an intermediate switch. It should be noted that switch 101 maintain similar forwarding information for physical egress switches as well.

Using the multiple paths, switch 101 can load balance among the paths to virtual edge switch 132. In the same way, switch 101 can load balance among the paths to virtual edge switch 134 via switches 104 and 105. Furthermore, if one of the paths become unavailable (e.g., due to a link or node failure), switch 101 can still forward packets via the other path. Suppose that switch 103 becomes unavailable (e.g., due to a node failure or a reboot). As a result, the path from switch 101 to virtual edge switch 132 via switch 103 becomes unavailable as well. Upon detecting the failure, switch 101 can forward packets to virtual edge switch 132 via switch 104. Routing, forwarding, and failure recovery of a network of interconnected switches, such as a fabric switch, is specified in U.S. patent application Ser. No. 13/087,239, titled "Virtual Cluster Switching," by inventors Suresh Vobbilisetty and Dilip Chatwani, filed 14 Apr. 2011, the disclosure of which is incorporated herein in its entirety.

In some embodiments, the forwarding table is populated when switch identifiers of the virtual edge switches are assigned by a physical switch of network 100. Suppose that switch 103 assigns a switch identifier to virtual edge switch 132, which, in turn, joins network 100 as a member switch. Virtual edge switch 132 then shares its reachability information with other member switches of network 100 via switch 103. Virtual edge switch 132 can use a notification service of network 100 to share this information. For example, virtual edge switch 132 can include the information in the payload of a notification message and send the notification message to a respective other switch (e.g., physical and virtual switch) of network 100.

Virtual edge switch 132 can maintain an edge MAC table which includes mappings between the switch identifier of virtual edge switch 132 and MAC addresses of virtual machines 114, 116, and 118. The edge MAC table can be populated based on MAC address learning. For example, when virtual edge switch 132 receives a packet from virtual machine 114, virtual edge switch 132 learns the MAC address of virtual machine 114, and maps the learned MAC address to the switch identifier of virtual edge switch 132. The edge MAC table can also be pre-populated with these mapping (e.g., based on pre-configuration, and not based on MAC address learning) in virtual edge switch 132. As a result, when virtual edge switch 132 becomes active, these mappings are available in its local edge MAC table. Similarly, virtual edge switch 134 maintains an edge MAC table which includes mappings between the switch identifier of virtual edge switch 134 and MAC addresses of virtual machines 124, 126, and 128.

During operation, virtual machine 114 sends a packet to virtual machine 124. Since virtual edge switch 132 resides in hypervisor 112, virtual edge switch 132 obtains the packet, encapsulates the packet in an encapsulation header (e.g., a TRILL header or an IP header), and sends the encapsulated packet in network 100 via an inter-switch port. Sending a packet includes identifying one or more egress ports for the packet and transmitting the packet via the identified port(s). Virtual edge switch 132 can use its switch identifier as the ingress switch identifier of the encapsulation header. If the destination is unknown, virtual edge switch 132 uses an "all switch" identifier corresponding to a respective switch in network 100 as the egress switch identifier of the encapsulation header and forwards the packet to switch 103. Virtual edge switch 132 forwards a packet with the "all switch" identifier as the egress switch identifier to a respective switch in network 100. In some embodiments, switch 132 sends the packet to a root switch of a multicast distribution tree comprising a respective switch (e.g., both physical and virtual switches) of network 100. The root switch sends the packet via the multicast distribution tree to a respective switch of network 100. The root switch may not forward the packet to the originating switch (i.e., virtual edge switch 132).

Since virtual edge switch 132 is coupled to switches 103 and 104, one of these switches receives the encapsulated packet. Suppose that switch 103 receives the packet. Upon receiving the packet, switch 103 can forward the packet based on the encapsulation header without learning the MAC address of virtual machine 114. In this way, in network 100, the virtual edge switches learn MAC addresses and the intermediate switches forwards the packets without learning a MAC address. When the packet reaches virtual edge switch 134, it consults its local edge MAC table and identifies the MAC address of virtual machine 124 in the local edge MAC table. Virtual edge switch 134 decapsulates the encapsulation header, extracts the inner packet, and forwards the inner packet to virtual machine 124. Virtual edge switch 134 learns the MAC address of virtual machine 114 from the inner packet and the switch identifier of virtual edge switch 132 from the encapsulation header, and updates its local edge MAC table with a mapping between the switch identifier of virtual edge switch 132 and the MAC address of virtual machine 114.

In some embodiments, virtual edge switch 134 creates a notification message and includes the mapping between virtual edge switch 134 and the MAC address of destination virtual machine 124 in the payload of the notification message. Depending on the MAC address sharing policy of network 100, the learned MAC address may or may not be shared with intermediate switches of network 100. For example, if the MAC address sharing policy of network 100 dictates that a learned MAC address should only be shared with edge switches, virtual edge switch 134 sends the notification message to a respective other edge switch of network 100. In this way, only the edge switches of network 100 (e.g., virtual edge switches 132 and 134) learn the MAC addresses used in a communication.

It should be noted that a physical switch can also be an edge switch. For example, switch 102 can be an edge switch because end device 160 is coupled to switch 102 via an edge port. Hence, switch 102 can also receive the notification message. If no packet is sent from virtual machine 128, virtual edge switch 132 does not learn the MAC address of virtual machine 128. The edge MAC tables in virtual edge switches 132 and 134 may not be shared or synchronized with intermediate switches of network 100. This allows isolation and localization of MAC address learning and prevents MAC address flooding in network 100.

On the other hand, if the MAC address sharing policy of network 100 dictates that a learned MAC address should be shared with all member switches of network 100, virtual edge switch 134 sends the notification message to a respective other member switch of network 100. As a result, intermediate switches of network 100 (e.g., switches 101, 103, 104, and 105) also the notification message. This provides backward compatibility and allows a device which does not support virtual edge switches to operate with network 100.

In some embodiments, virtual edge switches 132 and 134 support flow definitions associated with a software-defined network (SDN). The flow definitions can be based on the OpenFlow protocol for an SDN. A respective virtual edge switch, such as virtual edge switch 132, can maintain a flow table comprising one or more flow entries. A flow entry indicates how a packet belonging to a flow should be forwarded. For example, a flow entry can include an egress port for the packets of the flow and one or more actions to be performed on the packet. Upon receiving a packet, virtual edge switch 132 generates a flow key, which identifies a flow, based on the ingress port identifier of the packet, and one or more of layer-2, layer-3, and layer-4 header fields of the packet.

Virtual edge switch 132 applies a hash function to calculate a hash value, and uses the hash value to lookup the corresponding flow entry in the flow table. The lookup results in a series of actions applied to the packet, including modification to one or more header fields, addition or deletion of a virtual local area network (VLAN) tag, and identification of an egress port of the packet. This egress port can be a logical port (e.g., coupling a virtual machine in host machine 110). If the hash value does not match a flow entry in the flow table, the packet can be processed as a non-SDN packet (e.g., a packet for which no flow definition has been defined).

Since virtual edge switch 132 learns MAC address from received packets (e.g., Ethernet frames), in some embodiments, virtual edge switch 132 creates a flow entry upon learning a MAC address. This flow entry can indicate that a packet (e.g., an Ethernet frame) with the learned MAC address as the destination MAC address should be forwarded via the physical or logical port from which the MAC address has been learned. In addition to the generation of flow entries based on MAC address learning, flow entries comprising the associated actions may be added, modified, or deleted by an external controller. For example, an external OpenFlow controller, which can reside on a host machine (e.g., host machine 110), a physical switch (e.g., switch 101), or an end device (e.g., end device 16), can provide a flow definition to virtual edge switch 132, which in turn, creates a corresponding flow entry in the local flow table.

Figure 1B:
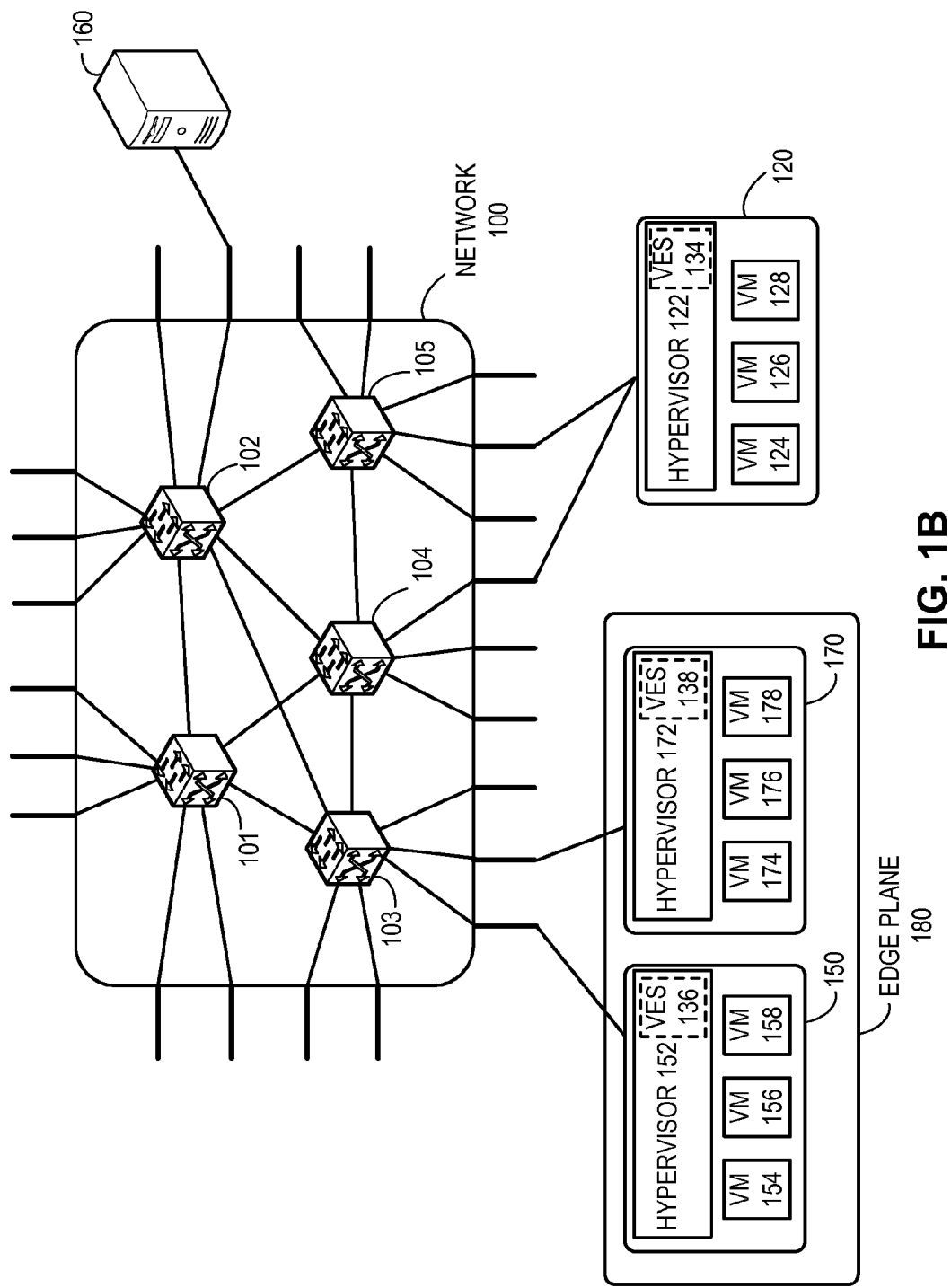
FIG. 1B illustrates an exemplary network with an edge plane comprising virtual edge switches, in accordance with an embodiment of the present invention.

FIG. 1B illustrates an exemplary network with an edge plane comprising virtual edge switches, in accordance with an embodiment of the present invention. In this example, end devices 150 and 170 are coupled to switch 103. End devices 150 and 170 can be host machines, each hosting one or more virtual machines. Host machine 150 includes a hypervisor 152 which runs virtual machines 154, 156, and 158, and host machine 170 includes a hypervisor 172 which runs virtual machines 174, 176, and 178. Host machines 150 and 170 include virtual switches 136 and 138, respectively.

Typically, the usage of processing capabilities of a host machine increases with the increase of operations of a virtual switch on the host machine. Hence, reducing the number of operations supported by a virtual switch may make more processing capabilities available for hosting more virtual machines. In some embodiments, switch 103 and virtual switches 136 and 138 can operate in a hierarchy. Virtual switches 136 and 138 are equipped with standard layer-2 forwarding capabilities and create a layer-2 edge plane 180. Virtual switches 136 and 138 may not participate in route formation of network 100. Furthermore, virtual switches 136 and 138 may not encapsulate packets from the virtual machines in their respective host machine. Switch 103 operates as a master switch for a respective switch of edge plane 180 and is responsible for encapsulation for the packets from these virtual machines.

Switch 103 also operates as an edge switch in network 100. Hence, switch 103 maintains an edge MAC table for virtual switches 136 and 138. The edge MAC table includes mappings between an identifier of virtual switch 136 and MAC addresses of virtual machines 154, 156, and 158. The edge MAC table also includes mappings between an identifier of virtual switch 138 and MAC addresses of virtual machines 174, 176, and 178. Examples of the identifiers of virtual switches 136 and 138 include, but are not limited to, a MAC address, an IP address, and an RBridge identifier. Switch 103 can also maintain a forwarding table entry mapping the identifier of virtual switches 136 and 138 and their respective egress ports (e.g., using a port identifier).

Other edge switches, such as virtual edge switch 134, of network 100 maintain a mapping between the switch identifier of switch 103 and the MAC addresses of virtual machines 154, 156, 158, 174, 176, and 178.

During operation, virtual machine 124 sends a packet (e.g., an Ethernet frame) to virtual machine 154. Virtual edge switch 134 receives the packet and determines that the destination MAC address is associated with switch 103. Virtual edge switch 134 encapsulates the packet with an encapsulation header and assigns the switch identifier of switch 103 as the egress switch identifier of the encapsulation header. Virtual edge switch 134 forwards the encapsulated packet to switch 104, which, in turn, forwards the packet to switch 103 based on the egress switch identifier of the encapsulation header. Switch 103 receives the packet, decapsulates the encapsulation header, and obtains the destination MAC address of the inner packet. Switch 103 identifies the MAC address in its local edge MAC table and obtains the identifier of virtual switch 136. Switch 103 identifies the egress port mapped to the identifier of virtual switch 136 and transmits the packet via the egress port. Virtual switch 136 receives the packet and provides the packet to virtual machine 154.

Mapping Tables

FIG. 2A illustrates an exemplary forwarding table with next-hop switches for virtual edge switches, in accordance with an embodiment of the present invention. Suppose that switches 103, 104, and 105 are associated with switch identifiers 212, 214, and 216, respectively, and virtual edge switches 132 and 134 are associated with switch identifiers 202 and 204, respectively. In this example, a forwarding table 200 of switch 101 includes a mapping between switch identifiers of virtual edge switches 132 and 134 and the next-hop switches from switch 101 for virtual edge switches 132 and 134.

Since switch 103 is a next-hop switch from switch 101 to virtual edge switch 132, forwarding table 200 includes a mapping between switch identifier 202 of virtual edge switch 132 and switch identifier 212 of switch 103. For the same reason, forwarding table 200 includes a mapping between switch identifier 202 and switch identifier 214 of switch 104. Because virtual edge switch 132 can participate in path discovery (e.g., based on a routing algorithm) in network 100, forwarding table 200 can be populated based on the path discovery. Similarly, switch 104 is a next-hop switch from switch 101 to virtual edge switch 134, forwarding table 200 includes a mapping between switch identifier 204 of virtual edge switch 134 and switch identifier 214 of switch 104. For the same reason, forwarding table 200 includes a mapping between switch identifier 204 and switch identifier 216 of switch 105.

FIG. 2B illustrates an exemplary edge MAC table in a virtual edge switch, in accordance with an embodiment of the present invention. Suppose that MAC addresses 232, 234, 236, and 238 are assigned to virtual machines 114, 116, 118, and 124, respectively. Virtual edge switch 132 maintains an edge MAC table 230, which includes mappings between switch identifier 202 of virtual edge switch 132 and MAC addresses 232, 234, and 234 of virtual machines 114, 116, and 118, respectively. Edge MAC table 230 can be populated based on MAC address learning. For example, when virtual edge switch 132 receives a packet from virtual machine 114, virtual edge switch 132 learns MAC address 232, and maps MAC address 232 to switch identifier 202 in an entry in edge MAC table 230. Edge MAC table 230 can also be pre-populated with these mapping (e.g., based on pre-configuration, and not based on MAC address learning)

in virtual edge switch 132. As a result, when virtual edge switch 132 becomes active, these mappings become available in edge MAC table 230.

Virtual edge switches 134 maintains a similar edge MAC table which includes mappings between switch identifier 204 of virtual edge switch 134 and MAC addresses of virtual machines 124, 126, and 128. Suppose that virtual edge switch 134 receives a packet with an encapsulation header with an "all switch" identifier as the egress switch identifier. If this packet includes an inner packet with MAC address 238 as the destination MAC address, virtual edge switch 134 determines that MAC address 238 is in the local edge MAC table. Virtual edge switch 134 then notifies virtual edge switch 132 and other edge switches of network 100 using a notification message comprising a mapping between switch identifier 204 and MAC address 238.

Upon receiving the notification message, virtual edge switch 132 learns the mapping and updates edge MAC table 230 with the mapping between switch identifier 204 and MAC address 238. In this way, edge MAC table 230 can include both pre-populated and learned MAC addresses. However, the learned MAC addresses in edge MAC table 230 are associated with a communication with virtual edge switch 132. For example, if virtual edge switch 132 is not in communication with virtual machine 128, edge MAC table 230 does not include the MAC address of virtual machine 128. It should be noted that edge MAC table 230 is local to virtual edge switch 132 and is not distributed to the intermediate switches of network 100.

Unknown Destination Discovery

Figure 3A:
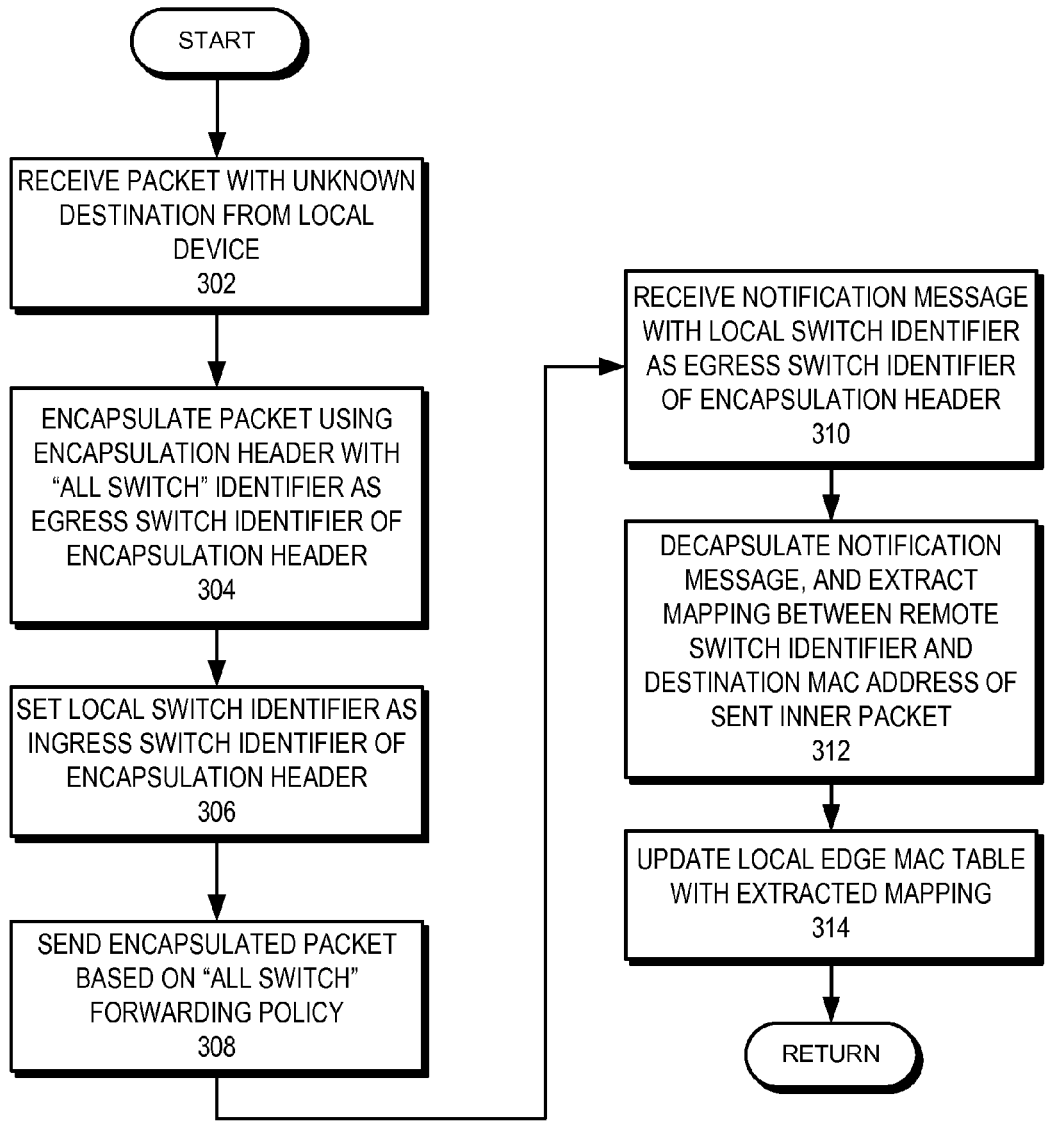
FIG. 3A presents a flowchart illustrating the process of a virtual edge switch discovering an unknown destination, in accordance with an embodiment of the present invention.

In the example in FIG. 1A, when virtual machine 114 sends a packet to virtual machine 124 and virtual edge switch 132 has not learned the MAC address of virtual machine 124, the MAC address of virtual machine 124 is an unknown destination. FIG. 3A presents a flowchart illustrating the process of a virtual edge switch discovering an unknown destination, in accordance with an embodiment of the present invention. During operation, the virtual edge switch of a network of interconnected switches receives a packet with an unknown destination from a local device (e.g., a local virtual machine) (operation 302).

The virtual edge switch encapsulates the packet an encapsulation header with an "all switch" identifier as the egress switch identifier of the encapsulation header (operation 304). This encapsulation header can be a fabric encapsulation header used to forward the packet in a fabric switch. This encapsulation header can also be a tunnel encapsulation header used to forward the packet via a tunnel. Examples of a tunnel include, but are not limited to, Virtual Extensible Local Area Network (VXLAN), Generic Routing Encapsulation (GRE), and its variations, such as Network Virtualization using GRE (NVGRE) and openvSwitch GRE. The virtual edge switch sets the local edge identifier as the ingress switch identifier of the encapsulation header (operation 306) and sends the encapsulated packet based on the "all switch" forwarding policy of the network (operation 308). Examples of an "all switch" forwarding policy include, but are not limited to, forwarding via a multicast tree comprising a respective switch of the network, forwarding via a multicast tree rooted at an egress switch, unicast forwarding to a respective member switch of the network, and broadcasting in the network.

If the unknown destination is coupled to a remote edge switch, the virtual edge switch can receive a notification message from the remote edge switch, with local switch identifier as the egress switch identifier of the encapsulation header (operation 310), as described in conjunction with FIG. 1A. The egress switch identifier can also be a multicast address of a multicast tree spanning the edge switches of the network. This notification message allows the virtual edge switch to learn a MAC address remotely learned at remote switch. The virtual edge switch decapsulates the notification message and extracts a mapping between a switch identifier and the destination MAC address of the sent inner packet (i.e., the unknown destination) (operation 312). The virtual edge switch then updates the local edge MAC table with the extracted mapping (operation 314), as described in conjunction with FIG. 2B.

Figure 3B:
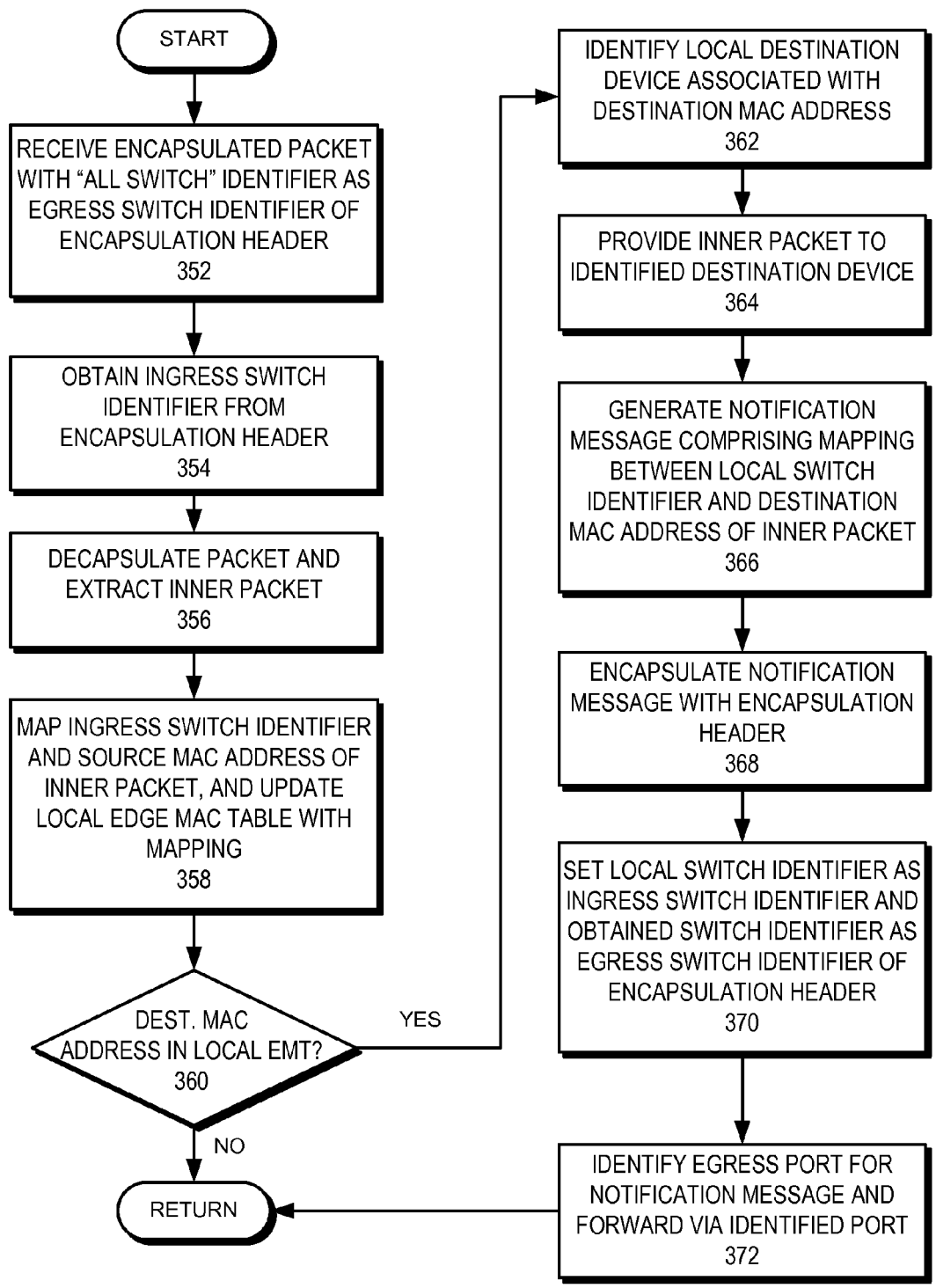
FIG. 3B presents a flowchart illustrating the process of a virtual edge switch responding to unknown destination discovery, in accordance with an embodiment of the present invention.

FIG. 3B presents a flowchart illustrating the process of a virtual edge switch responding to unknown destination discovery, in accordance with an embodiment of the present invention. During operation, the virtual edge switch of a network of interconnected switches receives an encapsulated packet with an "all switch" identifier as the egress switch identifier of the encapsulation header (operation 252). The virtual edge switch obtains the ingress switch identifier from the encapsulation header (operation 354), and decapsulates the packet and extracts the inner packet (operation 356). The virtual edge switch then maps the ingress switch identifier to the source MAC address of the inner packet, and updates the local edge MAC table with the mapping (operation 358).

The virtual edge switch checks whether the destination MAC address is in a local edge MAC table (operation 360). If so, the virtual edge switch identifies the local destination device (e.g., a virtual machine) associated with the destination MAC address (operation 362) and provides (e.g., logically switches) the inner packet to the identified destination device (operation 364). The virtual edge switch then generates a notification message comprising a mapping between the local switch identifier and the destination MAC address of the inner packet (operation 366) and encapsulates the notification message with an encapsulation header (operation 368). The virtual edge switch sets the local switch identifier as the ingress switch identifier and the obtained switch identifier as the egress switch identifier of the encapsulation header (operation 370). The virtual edge switch identifies an egress port for the notification message and forwards the notification message via the identified port (operation 372).

Packet Forwarding

Figure 4A:
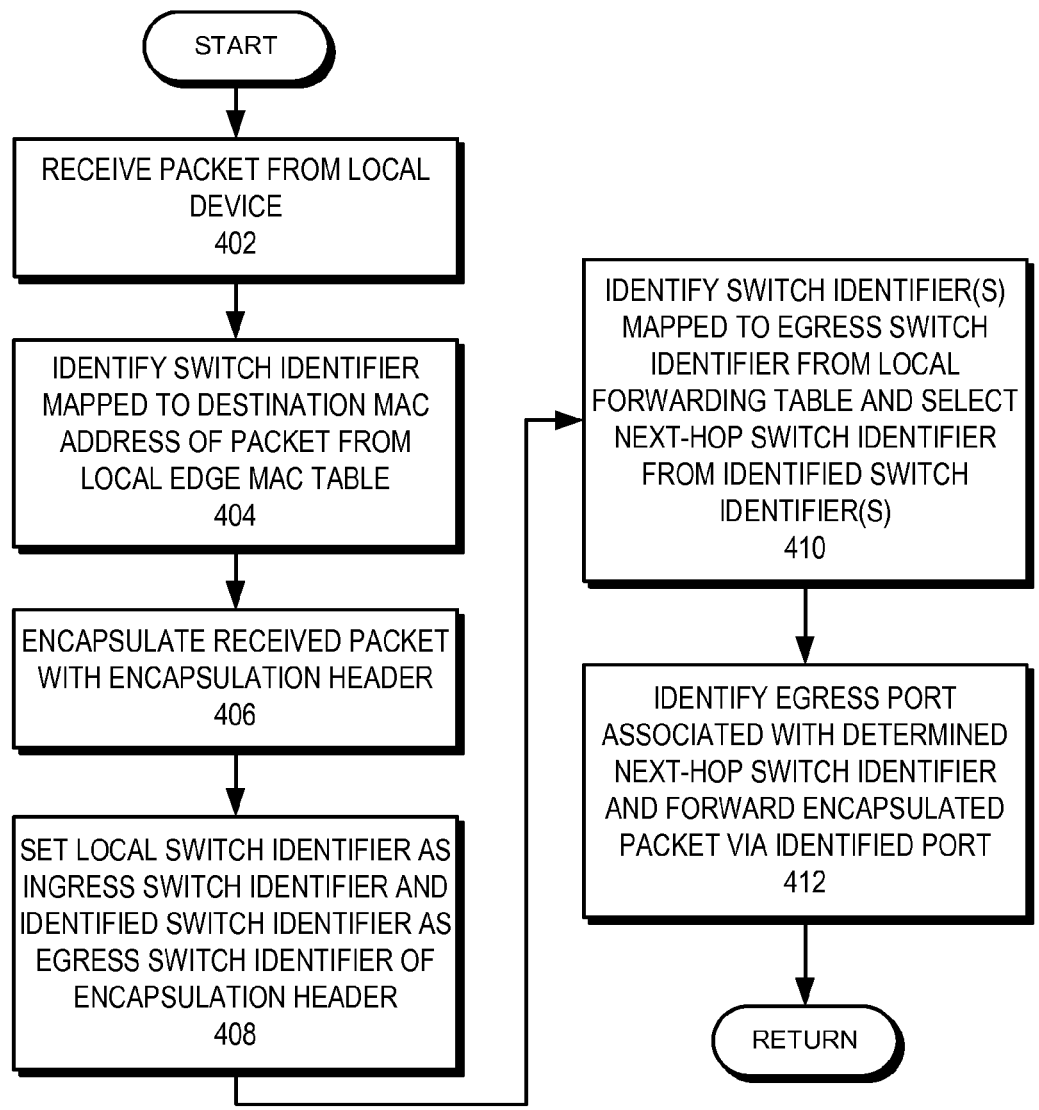
FIG. 4A presents a flowchart illustrating the process of a virtual edge switch forwarding a packet received from a local device, in accordance with an embodiment of the present invention.

In the example in FIG. 1A, virtual edge switch 132 encapsulates and forwards packets received from local virtual machines. Switch 103 or 104 receives the encapsulated packet and forwards the packet based on the encapsulation header. FIG. 4A presents a flowchart illustrating the process of a virtual edge switch forwarding a packet received from a local device, in accordance with an embodiment of the present invention. During operation, the virtual edge switch receives a packet from a local device, which can be a local virtual machine (operation 402). The virtual edge switch identifies the switch identifier mapped to the destination MAC address of the packet from a local edge MAC table (operation 404). If the destination MAC address is not in the local edge MAC table, the destination MAC address is an unknown destination, and the packet is forwarded accordingly, as described in conjunction with FIG. 3A. The virtual edge switch encapsulates the received packet with an encapsulation header (operation 406).

The virtual edge switch sets the local switch identifier as the ingress switch identifier and the identified switch identifier as the egress switch identifier of the encapsulation header (operation 408). The virtual edge switch identifies the switch identifier(s) mapped to the egress switch identifier from a forwarding table and select the next-hop switch identifier from the identified switch identifier(s) (operation 410). This selection can be based on a selection policy (e.g., load balancing, security, etc). The virtual edge switch then identifies an egress port associated with the determined next-hop switch identifier and forwards the encapsulated packet via the identified port (operation 412). It should be noted that this egress port can be a physical or a virtual port. If the encapsulation is based on a fabric encapsulation protocol (e.g., TRILL or IP), the virtual edge switch can obtain a MAC address mapped to the next-hop switch identifier and use that MAC address as an outer destination MAC address of the outer encapsulation header (e.g., an outer Ethernet header of a TRILL header).

Figure 4B:
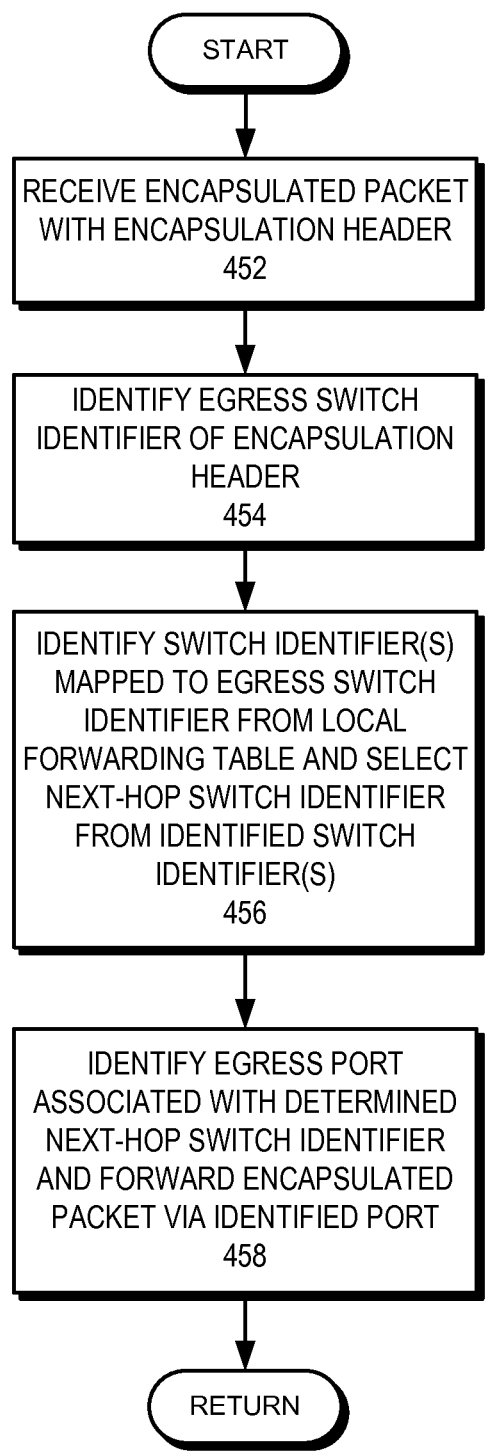
FIG. 4B presents a flowchart illustrating the process of an intermediate node forwarding a packet received from a virtual edge switch, in accordance with an embodiment of the present invention.

FIG. 4B presents a flowchart illustrating the process of an intermediate node forwarding a packet received from a virtual edge switch, in accordance with an embodiment of the present invention. During operation, the virtual edge switch receives an encapsulated packet with an encapsulation header (operation 452) and identifies the egress switch identifier of the encapsulation header (operation 454). The virtual edge switch identifies the switch identifier(s) mapped to the egress switch identifier from a forwarding table and select the next-hop switch identifier from the identified switch identifier(s) (operation 456). This selection can be based on a selection policy (e.g., load balancing, security, etc). The virtual edge switch then identifies an egress port associated with the determined next-hop switch identifier and forwards the encapsulated packet via the identified port (operation 458).

Exemplary Computing System

Figure 5:
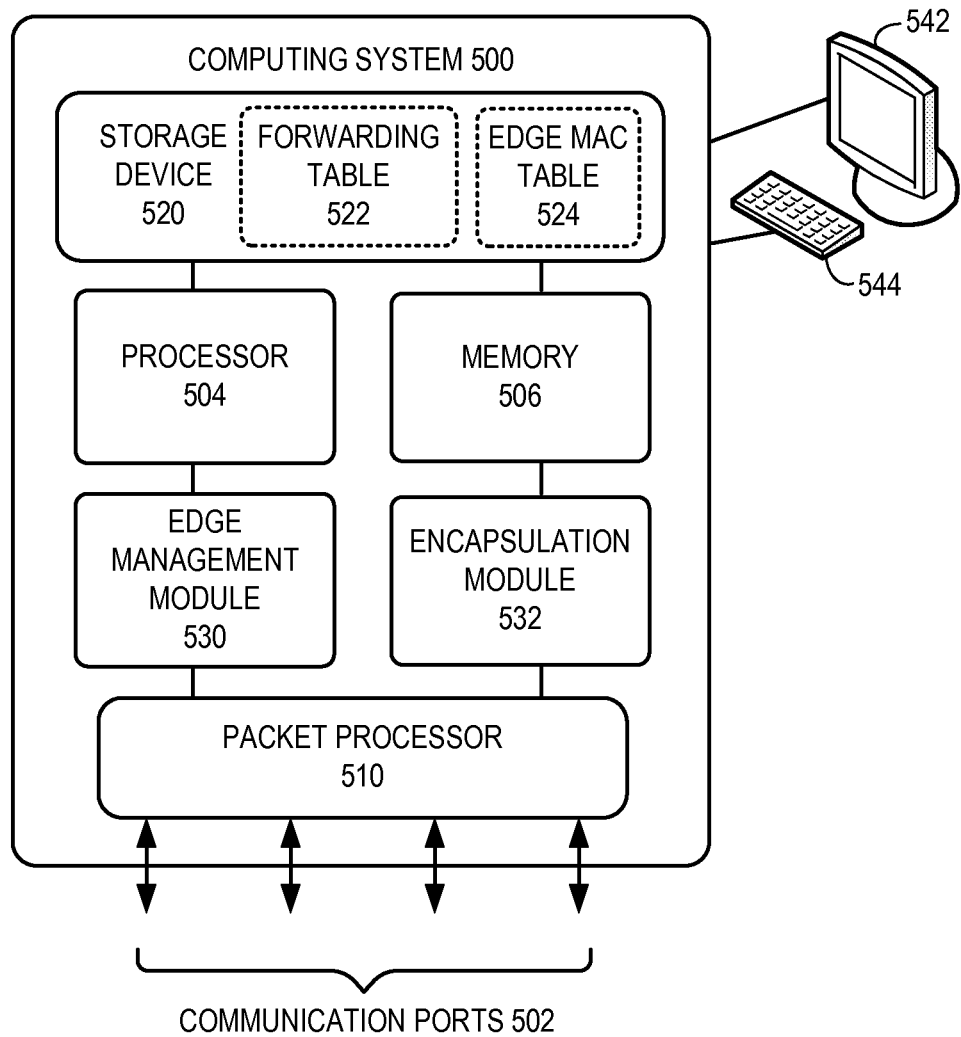
FIG. 5 illustrates an exemplary computing system with virtual edge switch support, in accordance with an embodiment of the present invention.

FIG. 5 illustrates an exemplary computing system with virtual edge switch support, in accordance with an embodiment of the present invention. In this example, a computing system 500 includes a general purpose processor 504, a memory 506, a number of communication ports 502, a packet processor 510, an edge management module 530, an encapsulation module 532, and a storage device 520. In some embodiments, edge management module 530 is in a NIC of computing system 500. Computing system 500 can be coupled to a display device 542 and an input device 544.

Edge management module 530 stores in storage device 520 a forwarding table 522 comprising a first mapping between a first switch identifier and a next-hop switch identifier for the first switch identifier, as described in conjunction with FIG. 2A. Edge management module 530 also stores in storage device 520 an edge MAC table 524 comprising a second mapping between the first switch identifier and a first MAC address of a remote device, as described in conjunction with FIG. 2B. Edge management module 530 can add the second mapping in the second table in response to identifying the second mapping in a payload of a notification message from a remote switch associated with the first switch identifier. Edge MAC table 524 can also include a third mapping between a second switch identifier of a local switching module and a MAC address of a local device. The local and remote devices can be virtual machines.

During operation, encapsulation module 532 encapsulates a first packet, which has first MAC address as a destination address, in a first encapsulation header with the first switch identifier as an egress switch identifier of the first encapsulation header. Edge management module 530 can determine whether a switch is capable of processing the first encapsulation header, as described in conjunction with FIG. 1A. In some embodiments, edge management module 530 maintains a membership in a network of interconnected switches (e.g., a fabric switch). A respective switch of the network is associated with a group identifier, which indicates whether the switch is a member switch of the network.

Note that the above-mentioned modules can be implemented in hardware as well as in software. In one embodiment, these modules can be embodied in computer-executable instructions stored in a memory which is coupled to one or more processors in computing device 500. When executed, these instructions cause the processor(s) to perform the aforementioned functions.

In summary, embodiments of the present invention provide a computing system and a method for extending the edge of a network. In one embodiment, the computing system includes a processor and a memory storing instructions that are executed by the processor. The computing system stores in a first table a first mapping between a first switch identifier and a next-hop switch identifier for the first switch identifier, and stores in a second table a second mapping between the first switch identifier and a first media access control (MAC) address of a remote device. The computing system encapsulates a first packet, which has first MAC address as a destination address, in a first encapsulation header with the first switch identifier as an egress switch identifier of the first encapsulation header. This encapsulated packet is forwarded in a network of interconnected switches based on the first encapsulation header.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   storing in a first data structure a first mapping between a first switch identifier and a second switch identifier, wherein the first switch identifier is allocated to a virtual switch in a hypervisor running a virtual machine, and wherein the second switch identifier indicates a next-hop switch with respect to the virtual switch;
   storing in a second data structure a second mapping between the first switch identifier and a first media access control (MAC) address of the virtual machine running on the hypervisor;
   identifying the first MAC address as a destination address of a first packet;

encapsulating the first packet with a first encapsulation header, which includes the first switch identifier as an egress switch identifier based on the second mapping; and determining, based on the first mapping, an egress port corresponding to the second switch identifier for the encapsulated packet.

2. The method of claim 1, wherein the second data structure is stored in a storage device of a switch of in a network of interconnected switches, wherein the virtual switch is reachable via an edge port of the switch, and wherein the network of interconnected switches is identified by a fabric identifier associated with a respective member of the network of interconnected switches.

3. The method of claim 1, further comprising storing in the second data structure a third mapping between a third switch identifier of a physical switch and a MAC address learned at the physical switch.

4. The method of claim 3, further comprising:
identifying the third switch identifier as an egress identifier in an encapsulation header encapsulating a second packet; and
determining, for the second packet, an egress port associated with the MAC address based on the third mapping.

5. The method of claim 1, further comprising adding the second mapping to the second data structure in response to identifying the second mapping in a payload of a notification message from the virtual switch.

6. The method of claim 1, further comprising determining whether a switch is capable of processing the first encapsulation header.

7. The method of claim 1, wherein the virtual switch is associated with a fabric identifier identifying a network of interconnected switches, wherein the fabric identifier being associated with the virtual switch indicates that the virtual switch is a member switch of the network of interconnected switches.

8. A non-transitory computer-readable storage medium storing instructions that when executed by a computer cause the computer to perform a method, the method comprising:
storing in a first data structure a first mapping between a first switch identifier and a second switch identifier, wherein the first switch identifier is allocated to a virtual switch in a hypervisor running a virtual machine, and wherein the second switch identifier indicates a next-hop switch with respect to the virtual switch;
storing in a second data structure a second mapping between the first switch identifier and a first media access control (MAC) address of the virtual machine running on the hypervisor;
identifying the first MAC address as a destination address of a first packet;
encapsulating the first packet with a first encapsulation header, which includes the first switch identifier as an egress switch identifier based on the second mapping; and
determining, based on the first mapping, an egress port corresponding to the second switch identifier for the encapsulated packet.

9. The non-transitory computer-readable storage medium of claim 8, wherein the second data structure is stored in a storage device of a switch in a network of interconnected switches, wherein the virtual switch is reachable via an edge port of the switch, and wherein the network of interconnected switches is identified by a fabric identifier associated with a respective member of the network of interconnected switches.

10. The non-transitory computer-readable storage medium of claim 8, wherein the method further comprises storing in the second data structure a third mapping between a third switch identifier of a physical switch and a MAC address learned at the physical switch.

11. The non-transitory computer-readable storage medium of claim 10, wherein the method further comprises
identifying the third switch identifier as an egress identifier in an encapsulation header encapsulating a second packet; and
determining, for the second packet, an egress port associated with the MAC address based on the third mapping.

12. The non-transitory computer-readable storage medium of claim 8, wherein the method further comprises adding the second mapping to the second data structure in response to identifying the second mapping in a payload of a notification message from the virtual switch.

13. The non-transitory computer-readable storage medium of claim 8, wherein the method further comprises determining whether a switch is capable of processing the first encapsulation header.

14. The non-transitory computer-readable storage medium of claim 8, wherein the virtual switch is associated with a fabric identifier identifying a network of interconnected switches, wherein the fabric identifier being associated with the virtual switch indicates that the virtual switch is a member switch of a network of interconnected switches.

15. A computing system, comprising:
a processor; and
a non-transitory computer-readable storage medium storing instructions which when executed by the processor causes the processor to perform a method, the method comprising:
storing in a first data structure a first mapping between a first switch identifier and a second switch identifier, wherein the first switch identifier is allocated to a virtual switch in a hypervisor running a virtual machine, and wherein the second switch identifier indicates a next-hop switch with respect to the virtual switch;
storing in a second data structure a second mapping between the first switch identifier and a first media access control (MAC) address of the virtual machine running on the hypervisor; and
identifying the first MAC address as a destination address of a first packet;
encapsulating the first packet with a first encapsulation header, which includes the first switch identifier as an egress switch identifier based on the second mapping; and
determining, based on the first mapping, an egress port corresponding to the second switch identifier for the encapsulated packet.

16. The computing system of claim 15, wherein the second data structure is stored in a storage device of a switch in a network of interconnected switches, wherein the virtual switch is reachable via an edge port of the switch, and wherein the network of interconnected switches is identified by a fabric identifier associated with a respective member of the network of interconnected switches.

17. The computing system of claim 15, wherein the method further comprises storing in the second data structure a third mapping between a third switch identifier of a physical switch and a MAC address learned at the physical switch.

18. The computing system of claim 17, wherein the method further comprises
   identifying the third switch identifier as an egress identifier in an encapsulation header encapsulating a second packet; and
   determining, for the second packet, an egress port associated with the MAC address based on the third mapping.

19. The computing system of claim 15, wherein the method further comprises adding the second mapping into the second data structure in response to identifying the second mapping in a payload of a notification message from the virtual switch.

20. The computing system of claim 15, wherein the method further comprises determining whether a switch is capable of processing the first encapsulation header.

21. The computing system of claim 15, wherein the virtual switch is associated with a fabric identifier identifying a the network of interconnected switches, wherein the fabric identifier being associated with the virtual switch indicates that the virtual switch is a member switch of a network of interconnected switches.

* * * * *